US012743532B2

(12) United States Patent
Zheng

(10) Patent No.: US 12,743,532 B2
(45) Date of Patent: Sep. 22, 2026

(54) DYNAMIC SECURITY CHALLENGE AUTHENTICATION

(71) Applicant: CITRIX SYSTEMS, INC., Fort Lauderdale, FL (US)

(72) Inventor: Nan Zheng, Nanjing (CN)

( * ) Notice: Subject to any disclaimer, the term of this patent is extended or adjusted under 35 U.S.C. 154(b) by 523 days.

(21) Appl. No.: 17/515,288

(22) Filed: Oct. 29, 2021

(65) Prior Publication Data

US 2023/0098536 A1 Mar. 30, 2023

Related U.S. Application Data

(63) Continuation of application No. PCT/CN2021/122016, filed on Sep. 30, 2021.

(51) Int. Cl.
*G06F 21/62* (2013.01)
*G06F 21/31* (2013.01)
*G06F 21/45* (2013.01)

(52) U.S. Cl.
CPC .......... *G06F 21/6209* (2013.01); *G06F 21/31* (2013.01); *G06F 21/45* (2013.01); *G06F 2221/2103* (2013.01); *G06F 2221/2131* (2013.01)

(58) Field of Classification Search
CPC ...... G06F 21/6209; G06F 21/31; G06F 21/45; G06F 2221/2103; G06F 2221/2131
See application file for complete search history.

(56) References Cited

U.S. PATENT DOCUMENTS 9,396,316 B1 * 7/2016 Altman .................. H04L 63/08
10,255,558 B1 * 4/2019 Kronrod ................ G06F 21/45
11,552,953 B1 * 1/2023 Avadhanam .......... H04L 63/102
2010/0122329 A1 * 5/2010 Jakobsson ............ G06F 21/316 726/6
2011/0191838 A1 * 8/2011 Yanagihara ............ G06F 21/00 726/26
2014/0137219 A1 * 5/2014 Castro .................... H04L 67/02 726/6
2015/0026796 A1 * 1/2015 Alan ...................... G06F 21/31 726/19
2016/0057110 A1 * 2/2016 Li ........................ G06F 21/316 726/7
2016/0191498 A1 * 6/2016 Marien ................ H04L 9/3271 726/7
2016/0378973 A1 * 12/2016 Melzer .................. G06N 20/00 726/6
2017/0317993 A1 * 11/2017 Weber .................... H04L 63/08
2018/0191699 A1 * 7/2018 Assali .................... H04L 63/08
2018/0205727 A1 * 7/2018 Hwang .................. H04L 63/08
2018/0295146 A1 * 10/2018 Kovega .............. H04L 63/1425
2019/0188374 A1 * 6/2019 Arunkumar .......... G06F 21/316
2020/0110866 A1 * 4/2020 Greenberger .......... G06F 21/36

(Continued)

*Primary Examiner* — Robert B Leung

(57) ABSTRACT

A method for dynamic security challenge authentication may include generating, based on data about one or more previous interactions of the user with a plurality of applications, files, and devices, one or more security challenges. Examples of interactions include launching an application, editing a file, and logging onto a device. The data may be retrieved from services or components involved with the interactions. The identity of the user may be authenticated based on the responses to the security challenges. Related systems and computer program products are also provided.

20 Claims, 7 Drawing Sheets

(56) References Cited

U.S. PATENT DOCUMENTS

| | | | | |
|---|---|---|---|---|
| 2020/0159731 | A1* | 5/2020 | Gino | G06F 9/5038 |
| 2020/0380112 | A1* | 12/2020 | Allen | G06N 5/013 |
| 2021/0099458 | A1* | 4/2021 | Su | H04L 63/102 |
| 2023/0035570 | A1* | 2/2023 | Edwards | G06N 3/088 |

* cited by examiner

DYNAMIC SECURITY CHALLENGE AUTHENTICATION

CROSS REFERENCE TO RELATED APPLICATIONS

This application is a continuation application of International Application No. PCT/CN2021/122016, filed Sep. 30, 2021 and entitled "DYNAMIC SECURITY CHALLENGE AUTHENTICATION," the disclosure of which is incorporated herein by reference in its entirety.

TECHNICAL FIELD

The subject matter described herein relates generally to computing systems and more specifically to control of access to applications.

BACKGROUND

Cloud computing can include the on-demand availability of a pool of shared computing resources, such as computer networks, server, data storage, software applications, and services, without direct active management by the user. The phrase can be generally used to describe data centers available to many users over the Internet. Large clouds often have functions distributed over multiple locations from central servers.

Some cloud computing providers can allow for scalability and elasticity via dynamic (e.g., "on-demand") provisioning of resources on a fine-grained, self-service basis. This can provide cloud computing users the ability to scale up when the usage need increases or down if resources are not being used.

SUMMARY

Methods, systems, and articles of manufacture, including computer program products, are provided for authentication using dynamically generated security challenges. In one aspect, there is provided a system including at least one data processor and at least one memory. The at least one memory may store instructions, which when executed by the at least one data processor, cause the at least one data processor to at least: receive a request to authenticate an identity of a user as part of a process to access an application; in response to the request, generate, based on data about one or more previous interactions of the user with a plurality of applications, files, and devices, a security challenge, the data being retrieved from services or components involved with the interactions, and the retrieval of the data being after the receipt of the request; and authenticate, based at least on a response to the security challenge, the identity of the user to enable the user to access an application or computing resource.

In some variations, one or more of the features disclosed herein including the following features can optionally be included in any feasible combination. The security challenge may be generated based on the one or more previous interactions that occurred within a threshold period of time.

In some variations, the one or more previous interactions may include at least one of launching an application, editing a file, and logging onto a device.

In some variations, the data may be retrieved by at least one of querying a database and making an application programming interface (API) call.

In some variations, the at least one data processor may be further caused to at least: identify at least one the plurality of applications, files, and devices that the user interacted with; and generate, for the security challenge, at least one correct response corresponding to the at least one the plurality of applications, files, or devices that the user interacted with.

In some variations, the at least one data processor may be further caused to at least: identify at least one of the plurality of applications, files, and devices that the user did not interact with; and generate, for the security challenge, at least one incorrect response corresponding to at least one of the plurality of applications, files, and devices that the user did not interact with.

In some variations, the security challenge may be in a multipart format. The identity of the user may be authenticated in response to receiving a correct response to at least a first part of the security challenge.

In some variations, a second part of the security challenge may be generated in response to receiving an incorrect response to the first part of the security challenge.

In some variations, the at least one data processor may be further caused to at least: in response to authenticating the identity of the user, perform at least one of a reset and recovery of a password associated with the application.

In some variations, the at least one data processor may be further caused to at least: in response to authenticating the identity of the user, enable access to the application.

In another aspect, there is provided a method for authentication using dynamically generated security challenges. The method may include: receiving a request to authenticate an identity of a user as part of a process to access an application; in response to the request, generating, based on data about one or more previous interactions of the user with a plurality of applications, files, and devices, a security challenge, the data being retrieved from services or components involved with the interactions, and the retrieval of the data being after the receipt of the request; and authenticating, based at least on a response to the security challenge, the identity of the user to enable the user to access an application or computing resource.

In some variations, one or more of the features disclosed herein including the following features can optionally be included in any feasible combination. The security challenge may be generated based on the one or more previous interactions that occurred within a threshold period of time.

In some variations, the one or more previous interactions may include at least one of launching an application, editing a file, and logging onto a device.

In some variations, the data may be retrieved by at least one of querying a database and making an application programming interface (API) call.

In some variations, the method may further include: identify at least one the plurality of applications, files, and devices that the user interacted with; and generate, for the security challenge, at least one correct response corresponding to the at least one the plurality of applications, files, or devices that the user interacted with.

In some variations, the method may further include: identify at least one of the plurality of applications, files, and devices that the user did not interact with; and generate, for the security challenge, at least one incorrect response corresponding to at least one of the plurality of applications, files, and devices that the user did not interact with.

In some variations, the security challenge may be in a multipart format. The identity of the user may be authenticated in response to receiving a correct response to at least a first part of the security challenge.

In some variations, a second part of the security challenge may be generated in response to receiving an incorrect response to the first part of the security challenge.

In some variations, the method may further include: in response to authenticating the identity of the user, perform at least one of a reset of a password associated with the application, a recovery of the password associated with the application, and an enablement of access to the application.

In some variations, one or more of the features disclosed herein including the following features can optionally be included in any feasible combination. receiving a request to authenticate an identity of a user as part of a process to access an application; in response to the request, generating, based on data about one or more previous interactions of the user with a plurality of applications, files, and devices, a security challenge, the data being retrieved from services or components involved with the interactions, and the retrieval of the data being after the receipt of the request; and authenticating, based at least on a response to the security challenge, the identity of the user to enable the user to access an application or computing resource.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to security challenge based authentication for accessing an application, it should be readily understood that such features are not intended to be limiting. The claims that follow this disclosure are intended to define the scope of the protected subject matter.

DESCRIPTION OF DRAWINGS

When practical, like reference symbols in the various drawings indicate like elements.

DETAILED DESCRIPTION

Figure 1:
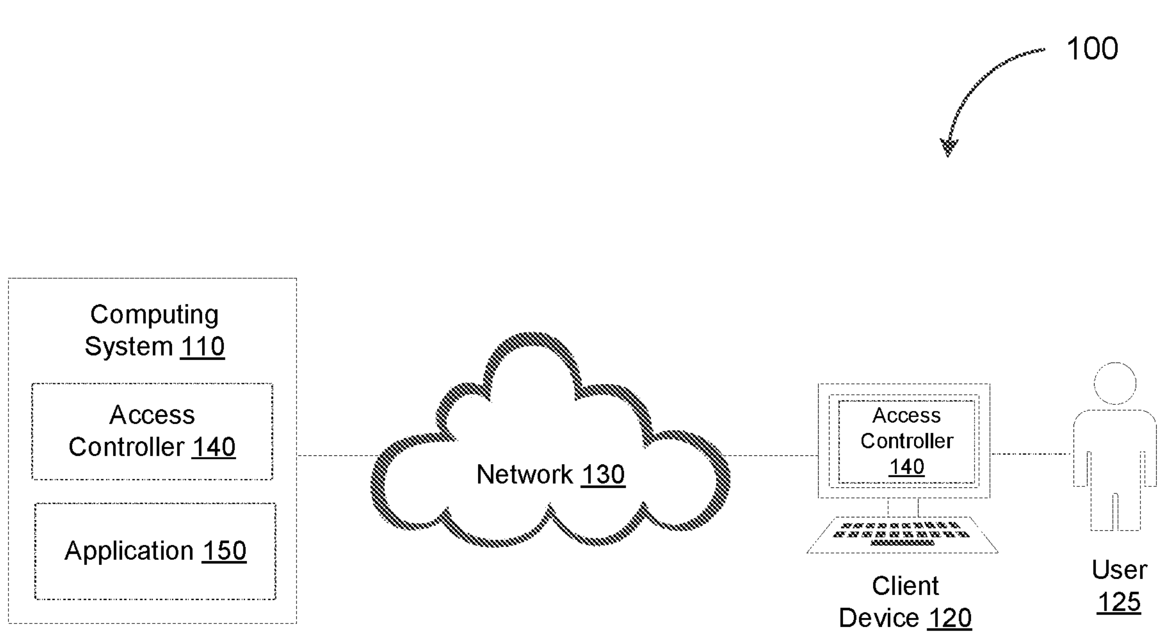
FIG. 1 depicts a system diagram illustrating an example of an access control system, in accordance with some example embodiments.

Cloud providers can provide a remote computing environment, for example, with virtual machine (VM) infrastructure such as a hypervisor using native execution to share and manage hardware, allowing for multiple computing environments which are isolated from one another, yet exist on the same physical machine. The computing environment can include an infrastructure as a service (IaaS) platform that provides application programming interfaces (APIs) to dereference low-level details of underlying network infrastructure. In such an infrastructure as a service platform, pools of hypervisors can support large numbers of virtual machines and include the ability to scale up and down services to meet varying needs. Infrastructure as a service platforms can provide the capability to the user to provision processing, storage, networks, and other fundamental computing resources where the user is able to deploy and run arbitrary software, which can include operating systems and applications.

Prior to granting a user access to a computing system, such as a cloud or remote computing system, or a resource hosted on the computing system, such as a software application, a service, or a data file, the user's identity may undergo various forms of authentication. Examples of user authentication techniques include password authentication, security challenge authentication, multi-factor authentication, certificate-based authentication, physiological biometric authentication, behavioral biometric authentication, token-based authentication, and/or the like.

Knowledge-based authentication, such as password authentication and security challenge authentication, may rely on knowledge of private information to verify the identity of the user seeking access to the computing system. For example, security challenge authentication may be used for self-service password reset or recovery. Alternatively and/or additionally, security challenge authentication may be used as a primary authentication factor or as one factor in multi-factor authentication. Conventional security challenges are predefined with the user selecting from a limited selection of challenges and providing the corresponding responses, for example, as part of a setup procedure. The static nature of conventional security challenges and responses may be inconvenient at least because the user is likely to forget the preset responses over time. Moreover, conventional security challenges may be vulnerable to a number of security flaws. For instance, the static nature of conventional security challenges and responses may increase the likelihood of malicious actors successfully guessing the responses and gaining unauthorized access to a computing system and the resources hosted thereon. In other instances, the static nature of conventional security challenges renders the challenges vulnerable to leakage or unauthorized use. This is so because static security challenges must stored or otherwise saved on computing systems and architecture that host the applications. In short, any hack or unauthorized breach of the host computing systems may lead to loss of data about users' security challenges. This a serious problem today, as hackers or other malicious actors are looking for new pieces of information to steal or otherwise obtain users' identities. Security challenge information is just the sort of information that malicious actors can use to steal a user's identity by combining that information with other personal identifiable information (PII) or using that information in a targeted attack on a user (e.g., a spear phishing attack). Such risks may be especially high for poorly designed security challenges with responses that can be collected easily through social engineering and when the user reuses the same challenges and responses across multiple service providers.

Accordingly, in some example embodiments, an access controller may be configured to provide dynamic security challenge authentication. For example, access to a resource at a computing system may be subjected to dynamic security challenge authentication in which the access controller generates a security challenge and the corresponding response based on interactions with various applications, files, and/or devices associated with the user. Dynamic security challenge authentication may be used as a primary authentication factor or as one factor in multi-factor authentication (MFA). Alternatively and/or additionally, dynamic security challenge authentication may be used for self-service password reset. Instead of predefined security challenges and responses that remains static, the dynamically generated security challenges and responses may change over time.

As noted, security challenges may be generated based on interactions with the one or more applications, files and/or devices associated with the user. While the user may be privy to such information, the dynamic nature of such security challenges and responses may minimize the likelihood of a malicious third party successfully guessing the responses and gaining unauthorized access to the resource. This is because dynamic security challenges may change frequently, thus rendering the responses harder for uncover through brute force attacks. Dynamic security challenges may also be less susceptible to breaches at least because dynamic security challenges and responses are not stored. To enhance the usability of dynamically generated security challenges, the access controller may generate security challenges based on interactions that occurred within a threshold period of time. For instance, the access controller may generate security challenges based on interactions that occurred within the most recent x-quantity of time (e.g., the last two days) to maximize the likelihood of the user knowing the responses to the security challenges.

FIG. 1 depicts a system diagram illustrating an example of an access control system 100, in accordance with some example embodiments. Referring to claim 1, the access control system 100 may include a computing system 110 and a client device 120, which are communicatively coupled via a network 130. In some cases, the computing system 110 may be a cloud computing system and/or a remote computing system accessible to the client device 120 via the network 130. The network 130 may be a wired network and/or a wireless network including, for example, a local area network (LAN), a virtual local area network (VLAN), a wide area network (WAN), a public land mobile network (PLMN), the Internet, and/or the like. The client device 120 may be processor-based devices including, for example, a smartphone, a personal computer, a tablet computer, a wearable apparatus, an Internet-of-Things (IoT) appliance, and/or the like.

Referring again to FIG. 1, the computing system 110 may include an access controller 140 configured to implement dynamic security challenge authentication. For example, in order for a user 125 at the client device 120 to be granted permission to access to the computing system 110 or an application 150 at the computing system 110, the access controller 140 may subject the user 125 to dynamic security challenge authentication in which the access controller 140 generates, based at least on one or more interactions with one or more applications, files, and/or devices, a security challenge. As shown in FIG. 1, the access controller 140 may be deployed at the computing system 110 and/or the client device 120. Alternatively and/or additionally, the access controller 140 may be a part of the resource, such as the application 150, that the user 125 at the client device 120 is attempting to access.

In some example embodiments, the access controller 140 may implement dynamic security challenge authentication as part of a self-service password reset and/or recovery process. Alternatively and/or additionally, the access controller 140 may use dynamic security challenge authentication as a primary authentication factor or as one factor in multi-factor authentication (MFA).

In some example embodiments, the application 150 may be a digital workspace application configured to provide a unified access point to a collection of resources including, for example, applications, files, devices, and/or the like. For example, the application 150 may provide access to one or more cloud-based resources (e.g., desktops, applications, files, and/or the like), which are accessible to the user 125 at the client device 120 via the network 130. Alternatively and/or additionally, the application 150 may also provide access to local resources at the client device 120, which are accessible without a connection to the network 130.

Figure 2:
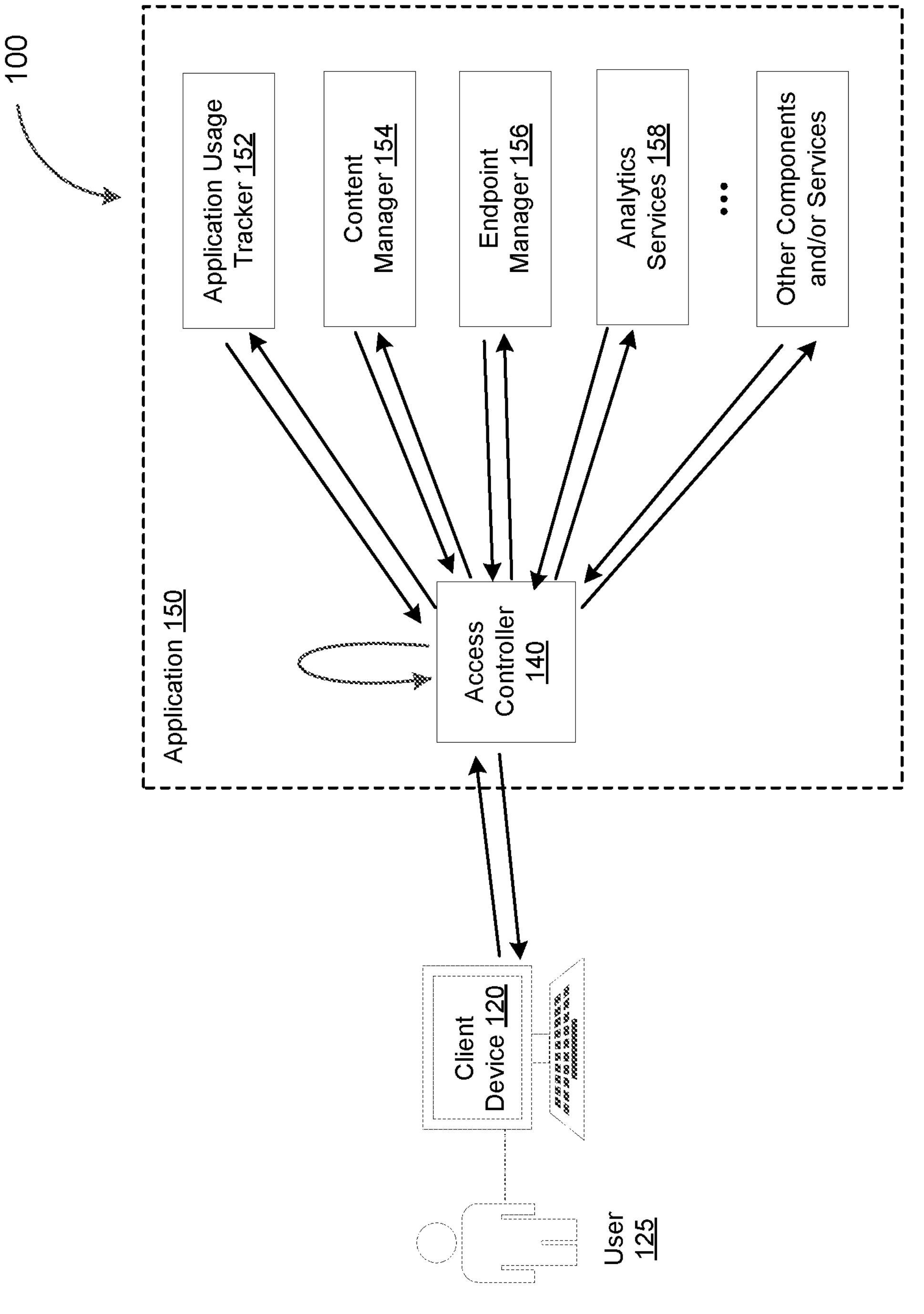
FIG. 2 depicts a schematic diagram illustrating another example of an access control system, in accordance with some example embodiments.

The access controller 140 may, as noted, authenticate the user 125 at the client device 120 by at least generating security challenges with responses that correspond to various interactions with the applications, files, and/or devices associated with the user 125. It should be appreciated that as a digital workspace application, the application 150 may be configured to provide access to such applications, files, and/or devices. In some cases, interactions with the applications, files, and/or devices may also include various configurations and preferences associated with the applications, files, and/or devices. FIG. 2 depicts a schematic diagram illustrating another example of the access control system 100, in accordance with some example embodiments. In the example of the access control system 100 shown in FIG. 2, the access controller 140 may be deployed as part of the application 150. As shown in FIG. 2, the access controller 140 may respond to a request to authenticate the user 125 at the client device 120 by aggregating information associated with various interactions with the applications, files, and/or devices from one or more services and/or components involved with such interactions. Examples of such services and/or components include an application usage tracker 152, a content manager 154, an endpoint manager 156, an analytics service 158, and/or the like. For example, the access controller 140 may query one or more services and/or components to identify the applications launched by the user 125, the files (or other content) worked on by the user 125, the devices that the user 125 logged onto, and the applications installed on the devices associated with the user 125. It should be appreciated that the applications and/or content the user 125 interacts with may include remotely hosted resources that the user 125 accesses from one or more devices associated with the user 125. Alternatively and/or additionally, the access controller 140 may query the analytics service 158, which may provide usage trends and habits associated with the user 125 that may also be used to generate the dynamic security challenges for authenticating the user 125.

To increase the usability of the dynamically generated security challenges, the access controller 140 may generate security challenges based on interactions that occurred within a threshold period of time. For example, the access controller 140 may generate security challenges based on interactions that occurred within the most recent x-quantity of time (e.g., the last two days) to maximize the likelihood of the user 125 knowing the responses to the security challenges. In some cases, instead of or in addition to interactions that occurred within a threshold period of time, the access controller 140 may generate security challenges based on interactions that did not occur during the threshold period of time. For instance, the access controller 140 may generate security challenges based on applications, files, and/or devices that the user 125 did not interact with during the most recent x-quantity of time (e.g., the last two days).

In some example embodiments, information may be gathered from the services and/or components in a variety of manner including by sending queries (e.g., structured query language (SQL) queries) to one or more databases and/or making application programming interface (API) calls. The access controller 140 may generate the security challenges by populating one or more template challenges with the information gathered from the services and/or components. One example security challenge may ask the user 125 to identify applications, files, and/or devices that the user 125 interacted with during the most recent x-quantity of time (e.g., the last two days). Examples of interactions may include accessing, launching, opening, creating, modifying, saving, logging into, deleting, moving, and/or the like. Another example of security challenge may ask the user 125 to identify applications or files that the user 125 interacted with via a specific device. In some cases, the access controller 140 may also generate, for individual security challenges, a selection of responses that include correct responses and incorrect responses. The correct response may be generated based on interactions that did occur whereas the incorrect responses may be generated based on interactions that did not occur.

Figure 3:
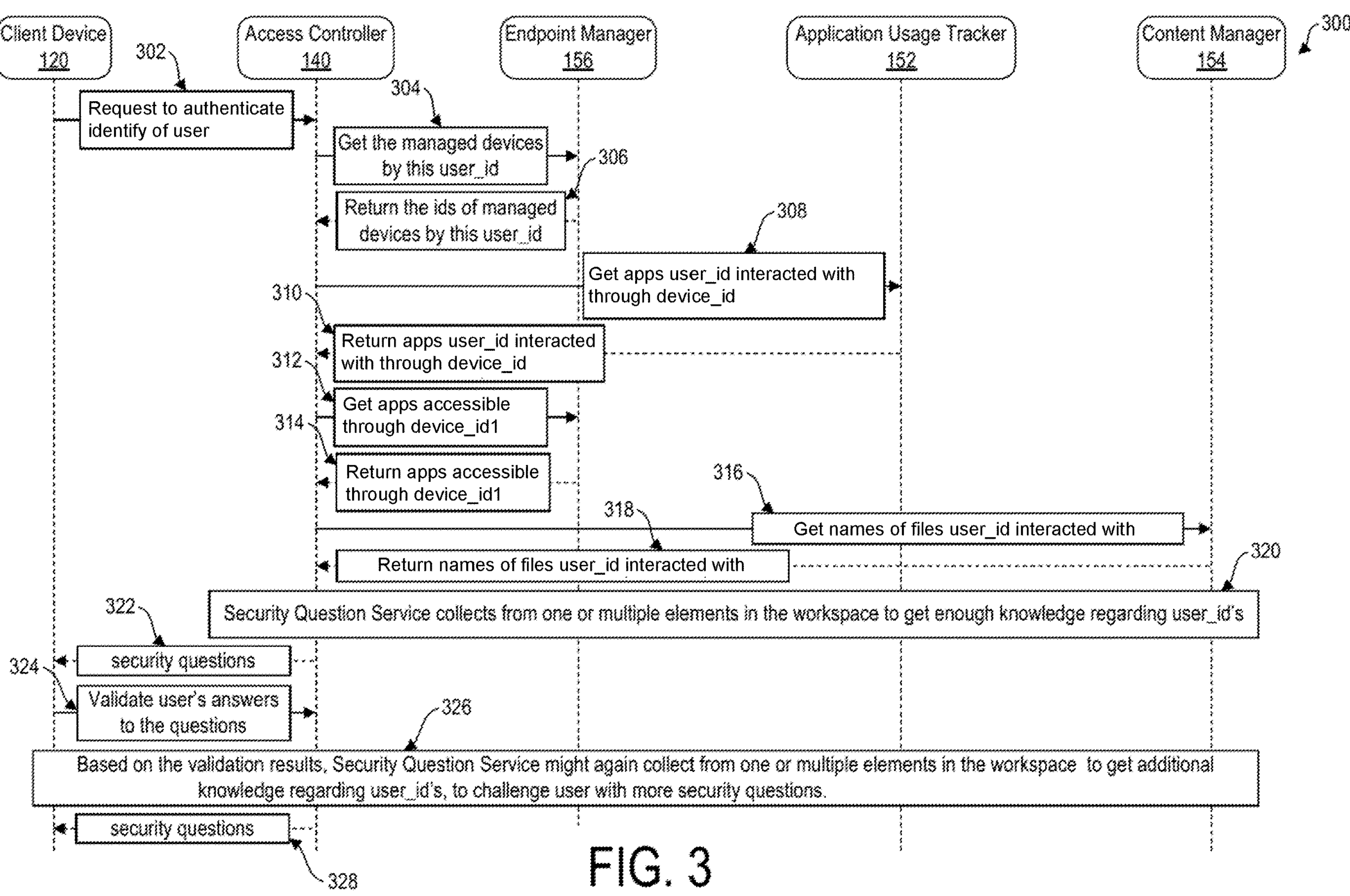
FIG. 3 depicts a sequence diagram illustrating an example of a process for dynamic security challenge authentication, in accordance with some example embodiments.

FIG. 3 depicts a sequence diagram illustrating an example of a process 300 for dynamic security challenge authentication, in accordance with some example embodiments. At 302, the client device 120 may send, to the access controller 140, a request to authenticate an identity of the user 125 at the client device 120. In response to the request from the client device 120, the access controller 140 may, at 304, query the endpoint manager 156 for one or more devices associated with the user identifier of the user 125. As used herein, the one or more devices associated with the user identifier of the user 125 may include devices registered as belonging to the user 125 and devices that the user 125 has logged into. The association between the user 125 and a device may be established by linking the user identifier of the user 125 and a device identifier of the device. At 306, the endpoint manager 156 may send, to the access controller 140, an identifier (e.g., device identifier) of a device associated with the user 125. At 308, the access controller 140 may query the application usage tracker 152 to identify the applications that the user 125 interacted with on the device with the device identifier returned to the access controller 140 at operation 306. Examples of interactions with an application may include accessing, launching, opening, creating, modifying, saving, logging into, deleting, and/or moving the application. At 310, the access controller 140 may receive, from the application usage tracker 152, the identifiers of the one or more applications that the user 125 launched on the device with the device identifier.

At 312, the access controller 140 may query the endpoint manager 156 to retrieve the identifiers of the applications accessible through the device having the device identifier. A variety of applications may be accessible to the user 125 through the client device 125 including, for example, applications installed locally at the client device 125, cloud-based applications, web-based applications, and/or the like. At 314, the endpoint manager 156 may send, to the access controller 140, the identifiers of the applications accessible through the device with the device identifier. At 316, the access controller 140 may query the content manager 154 to retrieve the identifiers of the files that the user 125 interacted with. The content manager 154 may track interactions between the user 125 and one or more files, which may be stored locally at the client device 120 and/or remotely by a cloud-based service. Examples of interactions with a file may include accessing, launching, opening, creating, modifying, saving, logging into, deleting, and/or moving the file. At 318, the content manager 154 may send, to the access controller 140, the identifiers of the files that the user 125 interacted with.

At 320, the access controller 140 may generate a security challenge based on the information collected from the application usage tracker 152, the content manager 154, and the endpoint manager 156. For example, the access controller 140 may generate security challenges asking the user 125 to identify one or more applications, files, and/or devices that the user 125 interacted with during the most recent x-quantity of time (e.g., the last two days). Another example security challenge may ask the user 125 to identify applications or files that the user 125 interacted with via a specific device. Alternatively and/or additionally, the security challenge may ask the user 125 to identify the user of a particular peripheral device, the type of content accessed (e.g., audio file, word document, image, and/or the like), and/or a pattern or sequence of the interactions. In some cases, the access controller 140 may generate, for individual security challenges, a selection of responses that include correct responses corresponding to the interactions that did occur and incorrect responses corresponding to the interactions that did not occur. In the example shown in FIG. 3, the access controller 140 may identify the applications, files, and/or devices that the user 125 did not interact with based on a difference between the applications, files, and/or devices the user 125 did interact with and those that are associated with the user 125. For instance, the applications that the user 125 did not interact with may correspond to a difference between the applications that the user 125 did interact with and the applications that are installed on the device associated with the user 125.

At 322, the access controller 140 may send, to the client device 120, the security challenge. At 324, the access controller 140 may authenticate the user 125 based on the responses received from the client device 120. As shown in FIG. 3, at 326, the access controller 140 may generate additional security challenges, for example, by querying the application usage tracker 152, the content manager 154, and the endpoint manager 156. In some cases, the user 125 may undergo a multipart security challenge, in which case the access controller 140 may generate additional security challenges. For example, the access controller 140 may generate additional security challenges in the event identity authentication requires the user 125 to provide the correct response to a threshold quantity of security challenges. The user 125 may be subjected to a multipart security challenge in a variety of scenarios. For instance, access to certain resources may require a multipart security challenge. Alternatively and/or additionally, additional security challenges may be generated as backups or alternates if the user 125 is unable to response a security challenge. At 328, the access controller 140 may send, to the client device 120, the additional security challenges.

Figure 4:
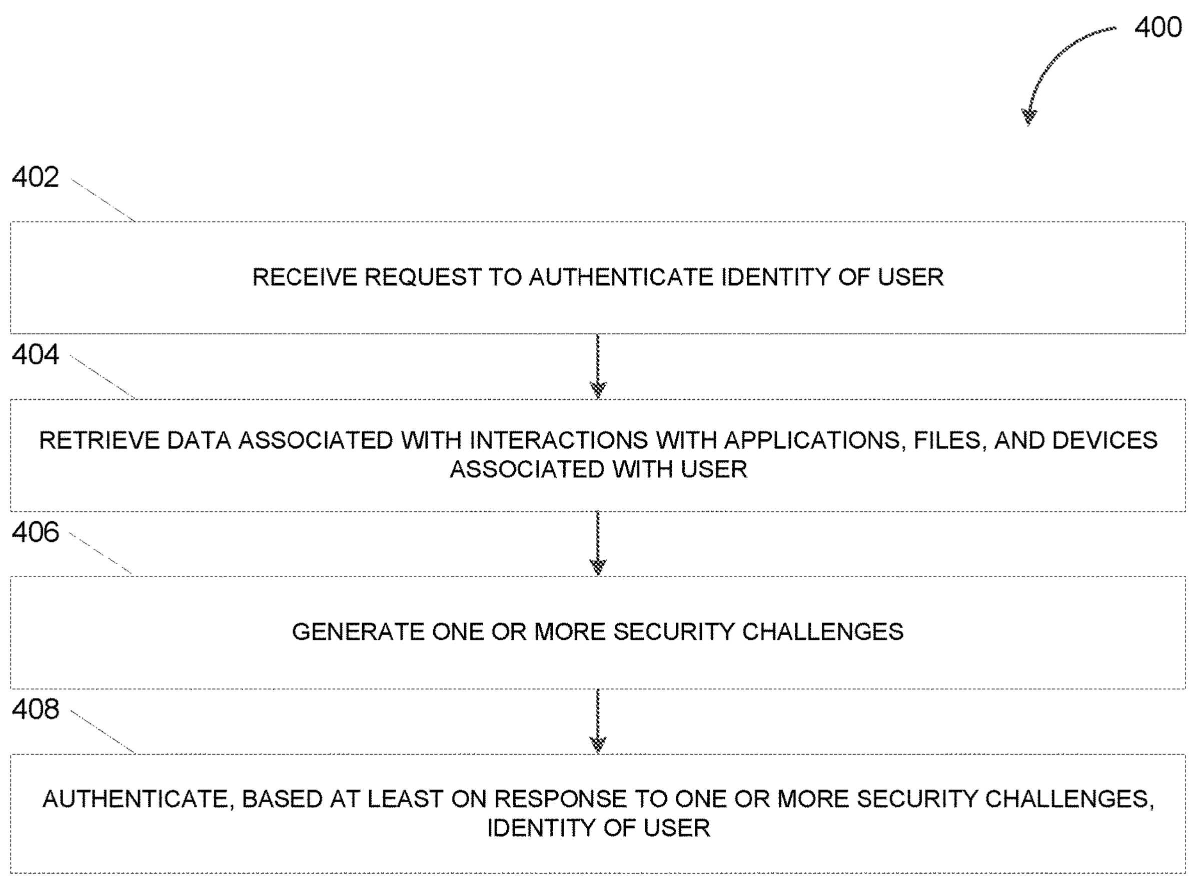
FIG. 4 depicts a flowchart illustrating an example of a process for dynamic security challenge authentication, in accordance with some example embodiments.

FIG. 4 depicts a flowchart illustrating an example of a process 400 for dynamic security challenge authentication, in accordance with some example embodiments. Referring to FIG. 4, the process 400 may be performed by the access controller 110 to authenticate the user 125 at the client device 120.

At 402, the access controller 140 may receive a request to authenticate an identity of a user. For example, the access controller 140 may receive, from the client device 120, a request to authenticate an identity of the user 125. The identity of the user 125 may be authenticated in order for the user 125 to access the computing system 110 or a resource hosted on the computing system 110. In some cases, the request to authenticate the identity of the user 125 may include a user identifier of the user 125. The request may be received as part of a self-service password reset or recovery procedure. Alternatively and/or additionally, the request may be received as part of a single factor authentication or multi-factor authentication process.

At 404, the access controller 140 may retrieve data associated with interactions with one or more applications, files, and/or devices. In some example embodiments, the access controller 140 may respond to the request to authenticate the identity of the user 125 by aggregating information on various interactions between the user 125 and one or more applications, files, and devices. As shown in FIG. 2, the access controller 140 may aggregate such information from a variety of sources including, for example, the application usage tracker 152, the content manager 154, the endpoint manager 156, and the analytics service 158. For example, the access controller 140 may query one or more services and/or components involved with the interactions to identify the applications launched by the user 125, the files (or other content) worked on by the user 125, the devices that the user 125 logged onto, and the applications installed on the devices associated with the user 125. In some cases, the access controller 140 may aggregate information on interactions that occurred within a threshold period of time such as, for example, the most recent x-quantity of time (e.g., the last two days).

At 406, the access controller 140 may generate one or more security challenges. In some example embodiments, the access controller 140 may generate security challenges based on the interactions between the user 125 and one or more applications, files, and/or devices. For example, the access controller 140 may generate a security challenge asking the user 125 to identify one or more applications, files, and/or devices that the user 125 interacted with during the most recent x-quantity of time (e.g., the last two days). Alternatively and/or additionally, the access controller 140 may generate a security challenge asking the user 125 to identify the applications or files that the user 125 interacted with via a specific device. In some cases, the access controller 140 may also generate, for individual security challenges, a selection of responses that include correct responses and incorrect responses, with the correct responses corresponding to the interactions that did occur and the incorrect responses corresponding to the interactions that did not occur.

At 408, the access controller 140 may authenticate, based at least on a response to the one or more security challenges, the identity of the user. For example, the access controller 140 may authenticate the identity of the user 125 if the access controller 140 receives, from the client device 120, a correct response for a threshold quantity of the security challenges. Upon authenticating the identity of the user 125, the access controller 140 may grant the user 125 access to the application 150 or another resource at the computing system 110. Where the identity of the user 125 is being authenticated for password reset or recovery, the access controller 140 may allow the user 125 to reset or recover an existing password upon authenticating the identity of the user 125.

In some cases, the access controller 140 may generate additional security challenges, which may serve as backups or alternates to security challenges when the user 125 provides an incorrect response to a security challenge. If the user 125 is unable to provide a correct response for the threshold quantity of security challenges, the access controller 140 may fail to authenticate the identity of the user 125. In that case, the access controller 140 may further prevent the user 125 from accessing the application 150 or other resources at the computing system 110.

Figure 5A:
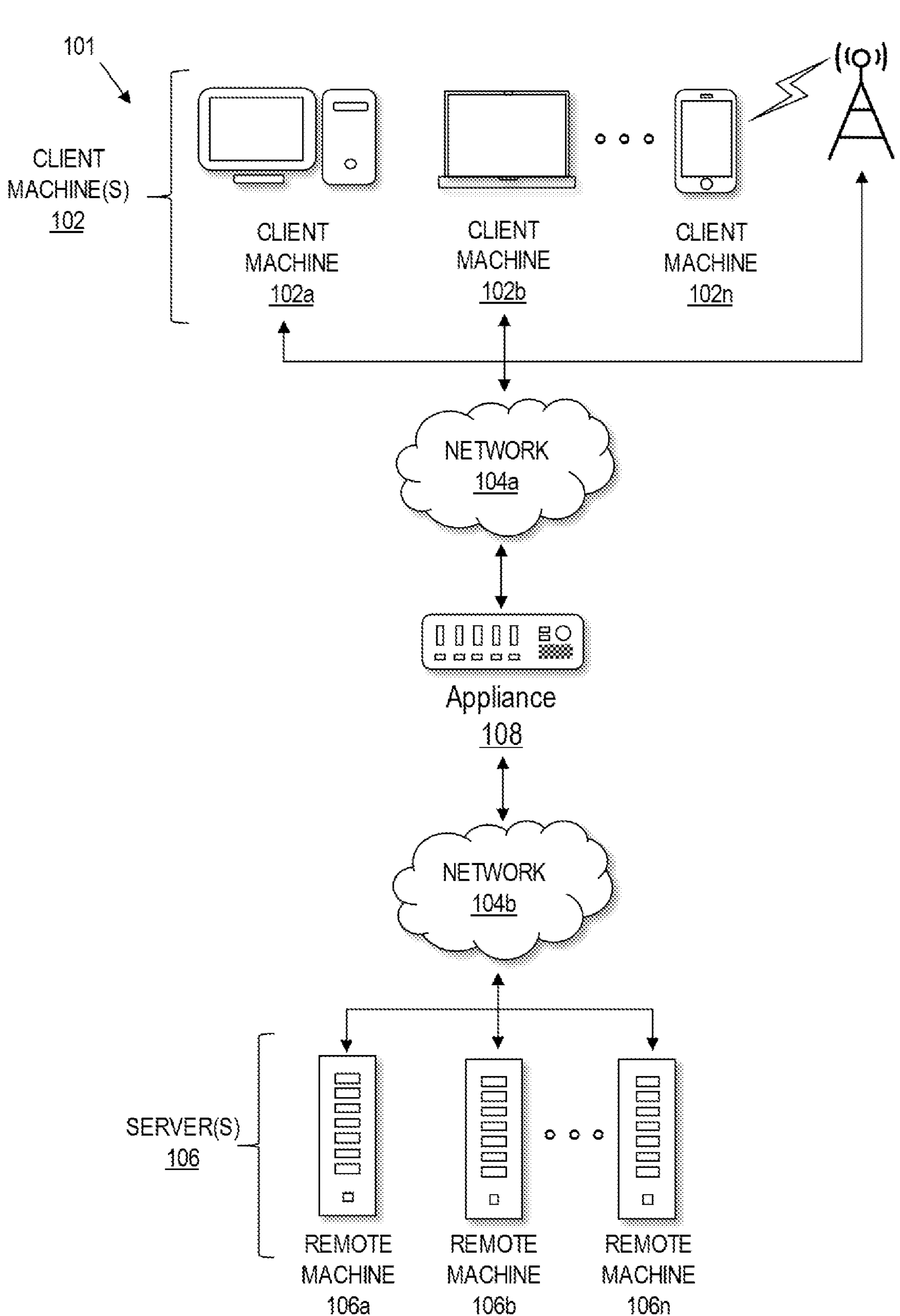
FIG. 5A depicts a network diagram illustrating an example of a network environment, in accordance with some example embodiments.

FIG. 5A depicts a network diagram illustrating an example of a network environment 101, in accordance with some example embodiments. Referring to FIGS. 1 and 5A, the network environment 101 in which various aspects of the disclosure may be implemented may include one or more client machines 102*a*-102*n*, one or more remote machines 106*a*-106*n*, one or more networks 104*a* and 104*b*, and one or more appliances 108 installed within the network environment 101. The client machines 102*a*-102*n* communicate with the remote machines 106*a*-106*n* via the networks 104*a* and 104*b*.

In some example embodiments, the client machines 102*a*-102*n* may communicate with the remote machines 106*a*-106*n* via an appliance 108. The illustrated appliance 108 is positioned between the networks 104*a* and 104*b*, and may also be referred to as a network interface or gateway. In some example embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example embodiments, multiple appliances 108 may be used, and the appliance(s) 108 may be deployed as part of the network 104*a* and/or 104*b*.

The client machines 102*a*-102*n* may be generally referred to as client machines, local machines, clients, client nodes, client computers, client devices, computing devices, endpoints, or endpoint nodes. The client machines 102*a*-102*n* may include, for example, the client machine 102 and/or the like. The remote machines 106*a*-106*n* may be generally referred to as servers or a server farm. In some example embodiments, a client 120 may have the capacity to function as both a client node seeking access to resources provided by a server 106 and as a server 106 providing access to hosted resources for other client machines 102*a*-102*n*. The networks 104*a* and 104*b* may be generally referred to as a network 104. The network 104 including the networks 104*a* and 104*b* may be configured in any combination of wired and wireless networks.

The servers 106 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. The servers 106 may include, for example, the access controller 140 and/or the like.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example embodiments, a server 106 may execute a remote presentation services program or other program that uses a thin-client or a remote-display protocol to capture display output generated by an application executing on a server 106 and transmit the application display output to a client machine 102.

In yet other example embodiments, a server 106 may execute a virtual machine providing, to a user of a client machine 102, access to a computing environment. The client machine 102 may be a virtual machine. The virtual machine may be managed by, for example, a hypervisor, a virtual machine manager (VMM), or any other hardware virtualization technique within the server 106.

In some example embodiments, the network 104 may be a local-area network (LAN), a metropolitan area network (MAN), a wide area network (WAN), a primary public network, and/or a primary private network. Additional embodiments may include one or more mobile telephone networks that use various protocols to communicate among mobile devices. For short-range communications within a wireless local-area network (WLAN), the protocols may include 802.11, Bluetooth, and Near Field Communication (NFC).

Figure 5B:
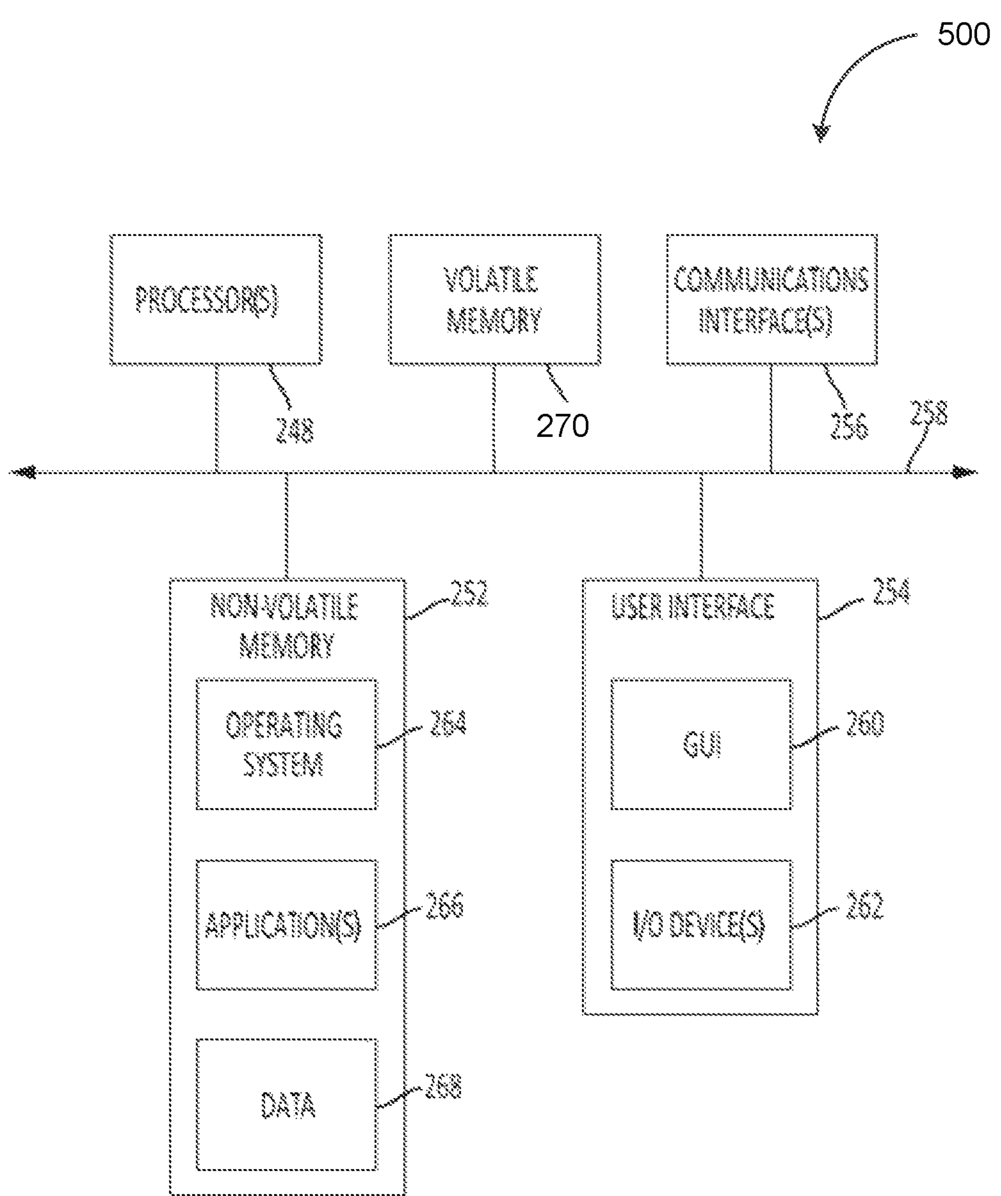
FIG. 5B depicts a block diagram illustrating an example of a computing device, in accordance with some example embodiments.

FIG. 5B depicts a block diagram illustrating an example of a computing device 500, in accordance with some example embodiments. Referring to FIGS. 1 and 5A-B, the computing device 500 may be useful for practicing an embodiment of the first client machine 102*a*, the second client machine 102*b*, the third client machine 102*c*, the fourth client machine 102*d*, and/or the access controller 140.

As shown in FIG. 5B, the computing device 500 may include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, and/or the like) and one or more input/output (I/O) devices 262 (e.g., a mouse, a keyboard, and/or the like). The non-volatile memory 252 may store an operating system 264, one or more applications 266, and data 268 such that computer instructions of the operating system 264 and/or applications 266 are executed by the processor(s) 248 out of the volatile memory 270. Data may be entered using an input device of the GUI 260 or received from I/O device(s) 262. Various elements of the computing device 500 may communicate via communication the communication bus 258. The computing device 500 as shown in FIG. 5B is shown merely as an example, as the first client machine 102*a*, the second client machine 102*b*, the third client machine 102*c*, the fourth client machine 102*d*, and/or the access controller 140 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example embodiments, the "processor" may be one or more physical processors or one or more "virtual" (e.g., remotely located or "cloud") processors.

The communications interfaces 256 may include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 may execute an application on behalf of a user of a client computing device (e.g., the clients 120), may execute a virtual machine, which provides an execution session within which applications execute on behalf of a user or a client computing device (e.g., the clients 120), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 5C:
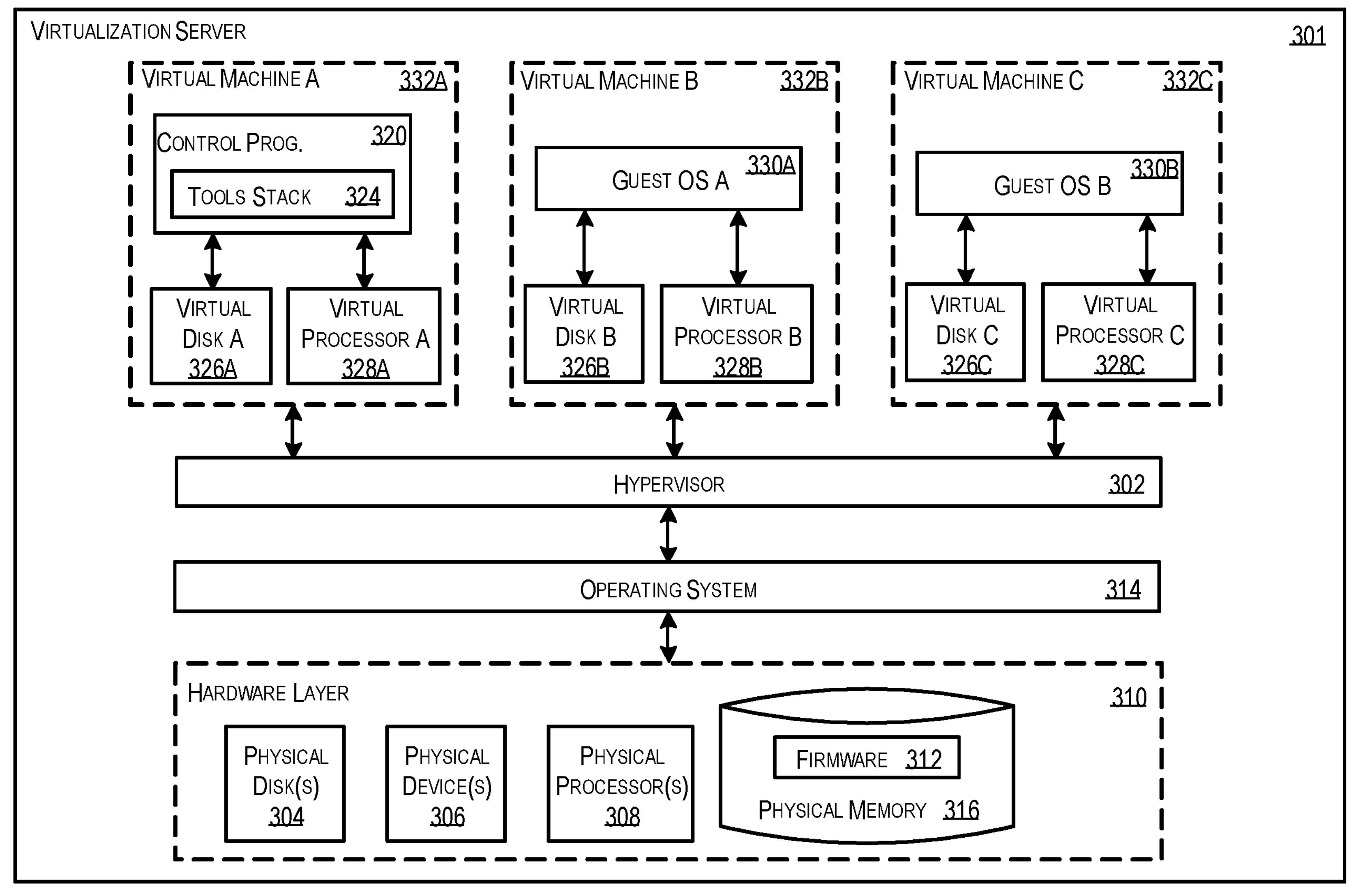
FIG. 5C depicts a high-level architecture of an example of a virtualization system for implementing a computing system, in accordance with some example embodiments.

FIG. 5C depicts a high-level architecture of an example of a virtualization system for implementing the computing system 110, in accordance with some example embodiments. As shown in FIG. 5C, the virtualization system may be a single-server or multi-server system, or a cloud system, including at least one virtualization server 301 configured to provide virtual desktops and/or virtual applications to one or more client access devices 120*a-c*. As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 301 may be configured as a virtualization server in a virtualization environment, for example, a single-server, multi-server, or cloud computing environment. Virtualization server 301 illustrated in FIG. 5C may be deployed as and/or implemented by one or more embodiments of server 106 illustrated in FIG. 5A or by other known computing devices. Included in virtualization server 301 is hardware layer 310 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C (generally 332). Each virtual machine 332 may have virtual disk 326A-C and virtual processor 328A-C. In some embodiments, first virtual machine 332A may execute, using virtual processor 328A, control program 320 that includes tools stack 324. Control program 320 may be referred to as a control virtual machine, Domain 0, Dom0, or other virtual machine used for system administration and/or control. In some embodiments, one or more virtual machines 332B-C may execute, using virtual processor 328B-C, guest operating system 330A-B (generally 330).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 5C illustrates an embodiment where firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, California; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. The virtualization server 301 may execute hypervisor 302 that creates a virtual machine platform on which guest operating systems 330 may execute. When this is the case, virtualization server 301 may be referred to as a host server. An example of such a virtualization server is Citrix Hypervisor® provided by Citrix Systems, Inc., of Fort Lauderdale, Florida.

Hypervisor 302 may create one or more virtual machines 332B-C (generally 332) in which guest operating systems 330 execute. In some embodiments, hypervisor 302 may load a virtual machine image to create virtual machine 332. The virtual machine image may refer to a collection of data, states, instructions, etc. that make up an instance of a virtual machine. In other embodiments, hypervisor 302 may execute guest operating system 330 within virtual machine 332. In still other embodiments, virtual machine 332 may execute guest operating system 330.

In addition to creating virtual machines 332, hypervisor 302 may control the execution of at least one virtual machine 332. The hypervisor 302 may present at least one virtual machine 332 with an abstraction of at least one hardware resource provided by virtualization server 301 (e.g., any hardware resource available within hardware layer 310). In some implementations, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

As shown in FIG. 5C, the virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While FIG. 5C illustrates an embodiment where virtualization server 301 hosts three virtual machines 332, in other embodiments virtualization server 301 may host any number of virtual machines 332. Hypervisor 302 may provide each virtual machine 332 with a unique virtual view of the physical hardware, including memory 316, processor 308, and other system resources 304, 306 available to that virtual machine 332. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C (generally 326) and virtual processor 328A-C (generally 328.) Virtual disk 326 may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. These particular virtual disk 326 (included in each virtual machine 332) may be unique, when compared with other virtual disks 326.

Virtual processor 328 may be a virtualized view of one or more physical processors 308 of virtualization server 301. The virtualized view of physical processors 308 may be generated, provided, and managed by hypervisor 302. Virtual processor 328 may have substantially all of the same characteristics of at least one physical processor 308. Virtual processor 308 may provide a modified view of physical processors 308 such that at least some of the characteristics of virtual processor 328 are different from the characteristics of the corresponding physical processor 308.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:

at least one data processor; and at least one memory storing instructions, which when executed by the at least one data processor, cause the at least one data processor to at least:

receive a request to authenticate an identity of a user as part of a process to access one or more applications, the request including a user identifier;

receive a plurality of device identifiers for a plurality of devices associated with the user identifier;

retrieve, using each of the plurality of device identifiers, from one or more services or components configured to monitor usage on the plurality of devices, first data corresponding to one or more previous interactions of the user with the one or more applications on a respective device of the plurality of devices;

retrieve, according to the first data, from the one or more services or components, second data corresponding to one or more files including information indicative of access linked to the user identifier via a respective device;

generate, based on the first data and the second data, a security challenge including a question relating to the one or more previous interactions of the user via at least one of the plurality of devices; and authenticate, using multi-factor authentication, based at least on a response to the question of the security challenge, the identity of the user to enable the user to access the one or more applications or a computing resource, wherein the response to the question is one factor in the multi-factor authentication.

2. The system of claim 1, wherein the security challenge is generated based on the one or more previous interactions that occurred within a threshold period of time.

3. The system of claim 1, wherein the one or more previous interactions include at least one of launching at least one of the one or more applications, editing a file, and logging onto a device of the plurality of devices.

4. The system of claim 1, wherein the first data and the second data are retrieved by at least one of querying a database and making an application programming interface (API) call.

5. The system of claim 1, wherein the at least one data processor is further caused to at least:

identify at least one the one or more applications that the user interacted with; and generate, for the security challenge, at least one correct response corresponding to the at least one the one or more applications that the user interacted with.

6. The system of claim 1, wherein the at least one data processor is further caused to at least:

identify at least one of the one or more applications that the user did not interact with; and generate, for the security challenge, at least one incorrect response corresponding to at least one of the one or more applications that the user did not interact with.

7. The system of claim 1, wherein the security challenge is in a multipart format, and wherein the identity of the user is authenticated in response to receiving a correct response to the question which is at least a first part of the security challenge.

8. The system of claim 7, wherein a second part of the security challenge is generated in response to receiving an incorrect response to the first part of the security challenge.

9. The system of claim 1, wherein the at least one data processor is further caused to at least:

in response to authenticating the identity of the user, perform at least one of a reset and recovery of a password associated with at least one of the one or more applications.

10. The system of claim 1, wherein the operations further comprise at least one data processor is further caused to at least:

in response to authenticating the identity of the user, enable access to at least one of the one or more applications.

11. A computer-implemented method, comprising:

receiving a request to authenticate an identity of a user as part of a process to access one or more applications, the request including a user identifier;

receiving a plurality of device identifiers for a plurality of devices associated with the user identifier;

retrieving, using each of the plurality of device identifiers, from one or more services or components configured to monitor usage on the plurality of devices, first data corresponding to one or more previous interactions of the user with the one or more applications on a respective device of the plurality of devices;

retrieving, according to the first data, from the one or more services or components, second data corresponding to one or more files including information indicative of access linked to the user identifier via a respective device;

in response to the request, generating, based on the first data and the second data, a security challenge including a question relating to the one or more previous interactions of the user via at least one of the plurality of devices; and authenticating, using multi-factor authentication, based at least on a response to the question of the security challenge, the identity of the user to enable the user to access the one or more applications or a computing resource, wherein the response to the question is one factor in the multi-factor authentication.

12. The method of claim 11, wherein the security challenge is generated based on the one or more previous interactions that occurred within a threshold period of time.

13. The method of claim 11, wherein the one or more previous interactions include at least one of launching at least one of the one or more applications, editing a file, and logging onto a device of the plurality of devices.

14. The method of claim 11, wherein the first data and the second data are retrieved by at least one of querying a database and making an application programming interface (API) call.

15. The method of claim 11, further comprising:

identifying at least one of the one or more applications that the user interacted with; and generating, for the security challenge, at least one correct response corresponding to the at least one of the one or more applications that the user interacted with.

16. The method of claim 11, further comprising:

identifying at least one of the one or more applications that the user did not interact with; and generating, for the security challenge, at least one incorrect response corresponding to at least one of the one or more applications that the user did not interact with.

17. The method of claim 11, wherein the security challenge is in a multipart format, and wherein the identity of the user is authenticated in response to receiving a correct response to the question which is at least a first part of the security challenge.

18. The method of claim 17, wherein a second part of the security challenge is generated in response to receiving an incorrect response to the first part of the security challenge.

19. The method of claim 11, further comprising:

in response to authenticating the identity of the user, performing at least one of a reset of a password associated with at least one of the one or more applications, a recovery of the password associated with at least one of the one or more applications, and an enablement of access to the at least one of the one or more applications.

20. A non-transitory computer readable medium storing instructions, which when executed by at least one data processor, result in operations comprising:

receiving a request to authenticate an identity of a user as part of a process to access an one or more applications, the request including a user identifier;

receiving a plurality of device identifiers for a plurality of devices associated with the user identifier;

retrieving, using each of the plurality of device identifiers, from one or more services or components configured to monitor usage on the plurality of devices, first data corresponding to one or more previous interactions of the user with the one or more applications on a respective device of the plurality of devices;

retrieving, according to the first data, from the one or more services or components, second data corresponding to one or more files including information indicative of access linked to the user identifier via a respective device;

generating, based on the first data and the second data, a security challenge including a question relating to the one or more previous interactions of the user via at least one of the plurality of devices; and authenticating, using multi-factor authentication, based at least on a response to the question of the security challenge, the identity of the user to enable the user to access the one or more applications or a computing resource, wherein the response to the question is one factor in the multi-factor authentication.

* * * * *